US012664816B2

(12) United States Patent
Kelkar et al.

(10) Patent No.: US 12,664,816 B2
(45) Date of Patent: Jun. 23, 2026

(54) SYSTEMS AND METHODS FOR FACE ANNOTATION

(71) Applicant: ADOBE INC., San Jose, CA (US)

(72) Inventors: Sachin Madhav Kelkar, San Jose, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 1023 days.

(21) Appl. No.: 17/657,195

(22) Filed: Mar. 30, 2022

(65) Prior Publication Data

US 2023/0316803 A1    Oct. 5, 2023

(51) Int. Cl.
| | |
|---|---|
| *G06V 40/16* | (2022.01) |
| *G06T 11/00* | (2006.01) |
| *G06V 10/22* | (2022.01) |
| *G06V 10/74* | (2022.01) |
| *G06V 10/82* | (2022.01) |
| *G06V 30/10* | (2022.01) |

(52) U.S. Cl.
CPC ............ *G06V 40/161* (2022.01); *G06T 11/00* (2013.01); *G06V 10/22* (2022.01); *G06V 10/761* (2022.01); *G06V 10/82* (2022.01); *G06V 30/10* (2022.01)

(58) Field of Classification Search
CPC ....... G06V 40/161; G06V 30/10; G06T 11/00
See application file for complete search history.

(56) References Cited

U.S. PATENT DOCUMENTS

| | | | | |
|---|---|---|---|---|
| 10,915,572 | B2 * | 2/2021 | Santos Moraes | ..... G06F 16/583 |
| 2002/0188602 | A1 * | 12/2002 | Stubler | .................. G06F 16/58 |
| 2017/0098153 | A1 * | 4/2017 | Mao | ....................... G06N 3/045 |
| 2018/0373955 | A1 * | 12/2018 | Soldevila | .............. G06F 18/214 |
| 2019/0303458 | A1 * | 10/2019 | Hwang | ................... G06F 16/51 |
| 2021/0303864 | A1 * | 9/2021 | Zhao | ......................... G06V 40/20 |
| 2022/0019734 | A1 * | 1/2022 | Kurma | ................. G06V 10/764 |
| 2023/0316803 | A1 * | 10/2023 | Kelkar | .................... G06T 11/00 |
| | | | | 382/103 |
| 2024/0070868 | A1 * | 2/2024 | Yu | ............................ G06T 7/11 |

OTHER PUBLICATIONS

Guillaumin, et al, Face Recognition from Caption-Based Supervision, Int J computer vision, pp. 64-82, Apr. 2011 (Year: 2011).*
Taherkhani, et al, PF-cpGAN: Profile to Frontal Coupled GAN for Face Recognition in the Wild, IEEE, pp. 1-10, Oct. 2020 (Year: 2020).*

(Continued)

*Primary Examiner* — Edward Park
(74) *Attorney, Agent, or Firm* — F. CHAU & ASSOCIATES, LLC

(57) ABSTRACT

Systems and methods for face annotation are described. One or more of the systems and methods include receiving a plurality of annotated images, wherein each annotated image of the annotated images comprises a caption; cropping the annotated image based on a face detection algorithm to obtain a face crop; comparing the face crop to the caption corresponding to the annotated image to obtain a caption similarity score; and filtering the plurality of annotated images based on the caption similarity score to obtain a plurality of annotated face images.

19 Claims, 12 Drawing Sheets

(56) References Cited

OTHER PUBLICATIONS

Nezami, et al, "Image Captioning using Facial Expression and Attention", Journal of Artificial Intelligence Research, pp. 661-689, Aug. 2020 (Year: 2020).*

Tang et al, "Attention-Guided Image Captioning throughWord Information", Sensors, pp. 1-14, Nov. 2021 (Year: 2021).*

Honda et al, "Removing Word-Level Spurious Alignment between Images and Pseudo-Captions in Unsupervised Image Captioning", pp. 1-11, Jun. 2021 (Year: 2021).*

Guo et al, "A fast face detection method via convolutional neural network", Neurocomputing, pp. 128-137, Jul. 2019 (Year: 2019).*

Radford et al, "Learning Transferable Visual Models From Natural Language Supervision", International Conference on Machine Learning, pp. 1-16, Feb. 2021 (Year: 2021).*

Schuhmann, et al, "LAION-400M: Open Dataset of CLIP-Filtered 400 Million Image-Text Pairs", CVPR, pp. 1-5, 2021 (Year: 2021).*

1Radford, et al., "Learning Transferable Visual Models from Natural Language Supervision", arXiv preprint arXiv:2103.00020v1 [cs.CV] Feb. 26, 2021, 48 pages.

* cited by examiner

Receive a set of annotated images — 205

Crop an annotated image based on a face detection algorithm to obtain a face crop — 210

Compare the face crop to the caption corresponding to the annotated image to obtain a caption similarity score — 215

Filter the set of annotated images based on the caption similarity score to obtain a set of annotated face images — 220

Extract one or more phrases from the caption of
the corresponding annotated image

⎭ 305

Compare the face crop to each phrase of the
one or more phrases to obtain a phrase
similarity score

⎭ 310

Generate an annotated face image based on the
face crop and each of a subset of the one or
more phrases based on the phrase similarity
score

⎭ 315

Identify a bounding box for a face in an
annotated image using a face detection
algorithm
~405

Crop the annotated image based on the face
detection algorithm to obtain a face crop
~410

Embed a face crop to obtain
a face crop embedding ⟍505

Embed a caption corresponding to an annotated
image to obtain a caption embedding ⟍510

Compute a cosine similarity between the face
crop embedding and the caption embedding ⟍515

Compare the face crop to the caption to obtain a
caption similarity score ⟍520

Identify a caption similarity threshold ⟍610

Determine whether a caption similarity score exceeds the caption similarity threshold ⟍615

Filter a set of annotated images based on the caption similarity score to obtain a set of annotated face images ⟍605

Identify a predetermined word that indicates the presence of a face          705

Determine that a caption of the set of images includes the predetermined word          710

Filter the set of images to include each caption that includes the predetermined word          715

Receive a set of annotated images ⟍1105

Compare a face crop of the annotated image to the caption corresponding to the annotated image to obtain a caption similarity score ⟍1110

Filter the set of annotated images based on the caption similarity score to obtain a set of annotated face images ⟍1115

Train the machine learning model using the set of annotated face images ⟍1120

Predict a caption for a face image ⌐1205

Compute a loss function by comparing the caption to the face image ⌐1210

Update the parameters of the machine learning model based on the loss function ⌐1215

SYSTEMS AND METHODS FOR FACE ANNOTATION

BACKGROUND

The following relates generally to image annotation, and more specifically to face annotation. Image annotation refers to associating descriptive text (i.e., captions) with an image. Face annotation is an example of image annotation in which a caption describes a face depicted in an image. Annotated face images is useful for search indexing images of faces and for training machine learning models to generate captions for images of faces.

Conventional methods of generating an annotated set of face images suitable for training a machine learning model include manually annotating face images, or cropping faces from images and indiscriminately using the unaltered captions associated with the images as captions for the cropped faces. However, manually annotating face images is impractically laborious at scale, and image captions from cropped often include information that is irrelevant to describing a face depicted in the image, leading to inaccurate search indexing or poor performance in caption generation models that have been trained on such a dataset.

SUMMARY

A method, apparatus, non-transitory computer readable medium, and system for face annotation are described. One or more aspects of the method, apparatus, non-transitory computer readable medium, and system include receiving a plurality of annotated images, wherein each annotated image of the annotated images comprises a caption; cropping the annotated image based on a face detection algorithm to obtain a face crop; comparing the face crop to the caption corresponding to the annotated image to obtain a caption similarity score; and filtering the plurality of annotated images based on the caption similarity score to obtain a plurality of annotated face images.

A method, apparatus, non-transitory computer readable medium, and system for face annotation are described. One or more aspects of the method, apparatus, non-transitory computer readable medium, and system include receiving a plurality of annotated images, wherein each annotated image of the annotated images comprises a caption; comparing a face crop of the annotated image to the caption corresponding to the annotated image to obtain a caption similarity score; filtering the plurality of annotated images based on the caption similarity score to obtain a plurality of annotated face images; and training a machine learning model using the plurality of annotated face images.

An apparatus, system, and method for face annotation are described. One or more aspects of the apparatus, system, and method include a face detection network configured to crop each annotated image of a plurality of annotated images to obtain a face crop; a comparison network configured to compare the face crop to a caption corresponding to the annotated image to obtain a caption similarity score; and a filtering component configured to filter the plurality of annotated images based on the caption similarity score to obtain a plurality of annotated face images.

DETAILED DESCRIPTION

Figure 1:
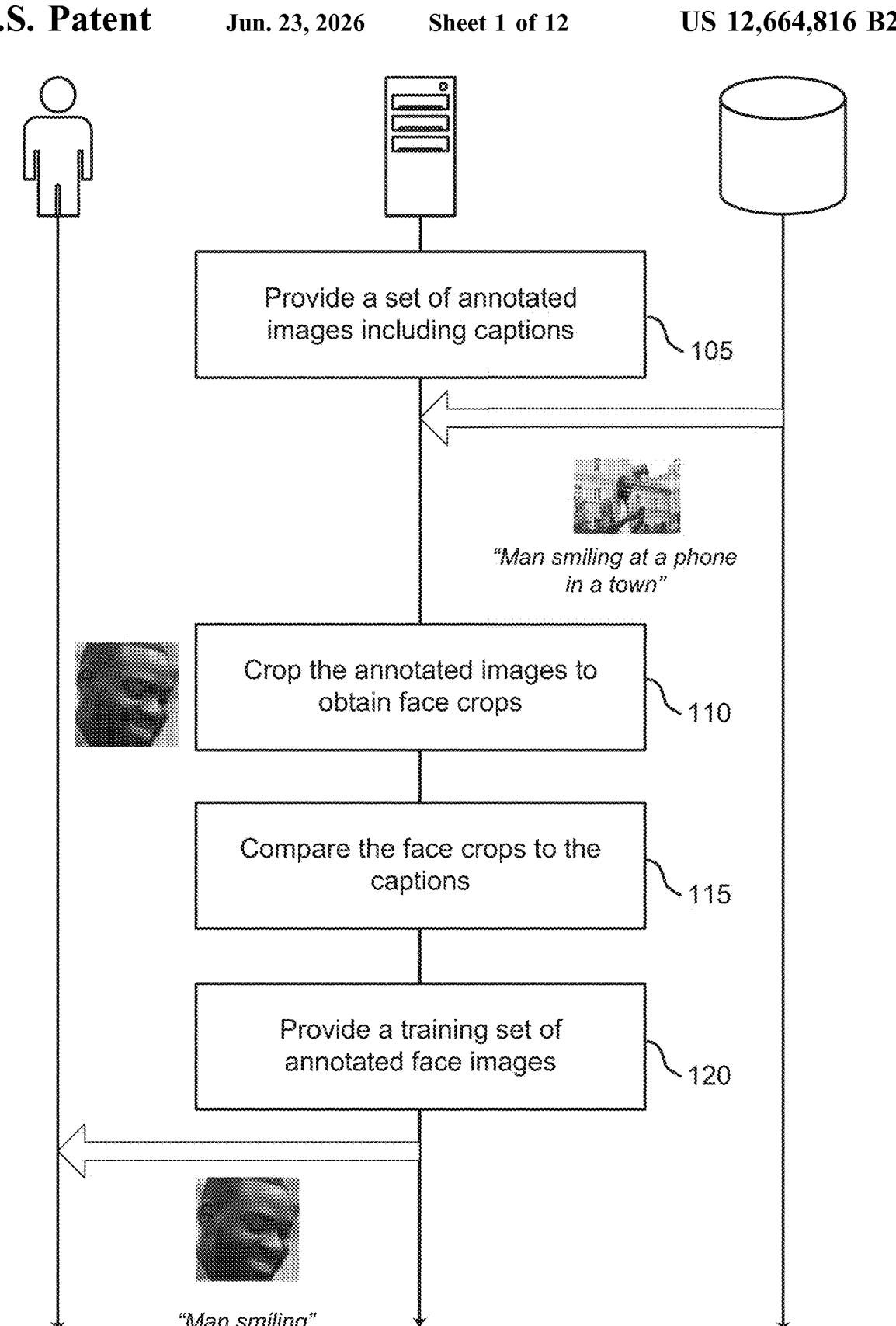
FIG. 1 shows an example of face annotation according to aspects of the present disclosure.

Image annotation refers to associating descriptive captions with an image. Face annotation is an example of image annotation in which a caption describes a face depicted in an image. A set of annotated face images is useful for search indexing purposes and for training machine learning models to generate captions for images of faces. Conventional methods of generating an annotated set of face images suitable for training a machine learning model include manually annotating face images, or cropping faces from images and indiscriminately using the unaltered captions associated with the images as captions for the cropped faces.

However, manually annotating face images is impractically laborious at scale, and image captions often include information that is irrelevant to describing a face depicted in the image, leading to inaccurate search indexing or poor performance in caption generation models that have been trained on such a dataset. For example, an image dataset such as stock photos or one obtained by web-crawling is useful due to the quantity of images it contains, but the image in the dataset are considered "weak-labeled" for the task of describing a face, as they do not include captions that are specifically directed to describing faces depicted in the images.

The present disclosure provides systems and methods for annotating images of faces. At least one embodiment of the present disclosure receives a plurality of annotated images, wherein each annotated image of the annotated images comprises a caption, crops the annotated image based on a face detection algorithm to obtain a face crop, compares the face crop to the caption corresponding to the annotated image to obtain a caption similarity score, and filters the plurality of annotated images based on the caption similarity score to obtain a plurality of annotated face images.

Accordingly, at least one embodiment is able to obtain a set of annotated face images without the time and labor that is necessary for manually annotating images, and without the inclusion of non-descriptive captions in the annotated face image set.

At least one embodiment of the present disclosure may be used in the natural language processing context. Natural language processing (NLP) refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers. One application of NLP techniques is generating captions for images. An example of a machine learning model that uses NLP for caption generation is a vision-language pre-trained model.

By cropping faces from a set of annotated images and comparing the face crops to captions corresponding to the annotated images using a machine learning model, a machine learning apparatus according to at least one embodiment of the present disclosure determines whether a face crop and caption pair is sufficiently similar to be added to a set of annotated face images. Therefore, the machine learning apparatus provides a set of annotated face images for training an NLP caption generating model that includes relevant captions and excludes irrelevant captions. The machine learning apparatus is therefore agnostic regarding the relevancy of the captions in the input set of annotated images to the faces included in the images or the size of the input set of annotated images, thereby allowing a large input data set to be used while avoiding the time and labor necessary in manually annotating a large data set.

An example application of the present disclosure in the natural language processing context is provided with reference to FIG. 1. Example processes for face annotations are provided with reference to FIGS. 2-7. Details regarding the architecture of an example machine learning apparatus are provided with reference to FIGS. 8-10. Example processes for training a machine learning model are provided with reference to FIGS. 11 and 12.

Face Annotation

In FIGS. 1-7, a method for face annotation is described. One or more aspects of the method include receiving a plurality of annotated images, wherein each annotated image of the annotated images comprises a caption; cropping the annotated image based on a face detection algorithm to obtain a face crop; comparing the face crop to the caption corresponding to the annotated image to obtain a caption similarity score; and filtering the plurality of annotated images based on the caption similarity score to obtain a plurality of annotated face images.

Some examples of the method further include identifying a bounding box for a face in the annotated image using the face detection algorithm, wherein the cropping is based on the bounding box.

Some examples of the method further include embedding the face crop to obtain a face crop embedding. Some examples further include embedding the caption to obtain a caption embedding, wherein the comparing is between the face crop embedding and the caption embedding. In some aspects, the face crop embedding and the caption embedding are located in a same embedding space. Some examples of the method further include computing a cosine similarity between the face crop embedding and the caption embedding, wherein the caption similarity score is based on the cosine similarity.

Some examples of the method further include identifying a caption similarity threshold. Some examples further include determining whether the caption similarity score exceeds the caption similarity threshold, wherein the filtering is based on the determination. Some examples of the method further include identifying a predetermined word that indicates the presence of a face. Some examples further include determining that a caption of the plurality of annotated images includes the predetermined word. Some examples further include filtering the plurality of annotated images to include each caption that includes the predetermined word.

Some examples of the method further include extracting one or more phrases from the caption of the corresponding annotated image. Some examples further include comparing the face crop to each phrase of the one or more phrases to obtain a phrase similarity score. Some examples further include generating an annotated face image based on the face crop and each of a subset of the one or more phrases based on the phrase similarity score.

Some examples of the method further include embedding the face crop to obtain a face crop embedding. Some examples further include embedding the phrase to obtain a phrase embedding, wherein the comparing is between the face crop embedding and the phrase embedding. Some examples of the method further include adding one or more pseudo-phrases to the one or more phrases, where the phrase similarity score is computed based on the one or more pseudo-phrases.

FIG. 1 shows an example of face annotation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 1, at least one embodiment of the present disclosure may be used in a natural language processing context. For example, an NLP face image captioning model requires a training data set to compare its output against. Therefore, in an example, a machine learning apparatus as described with reference to FIGS. 8 and 9 retrieves a set of annotated images including captions, crops each of the set of annotated images to produce face crops, compares the face crops to captions corresponding to the annotated images, and provides a training set of annotated face images based on the comparison, thereby providing the NLP model with a sufficiently large and accurately captioned data set to learn from while avoiding the need to manually annotate the data set.

Figure 7:
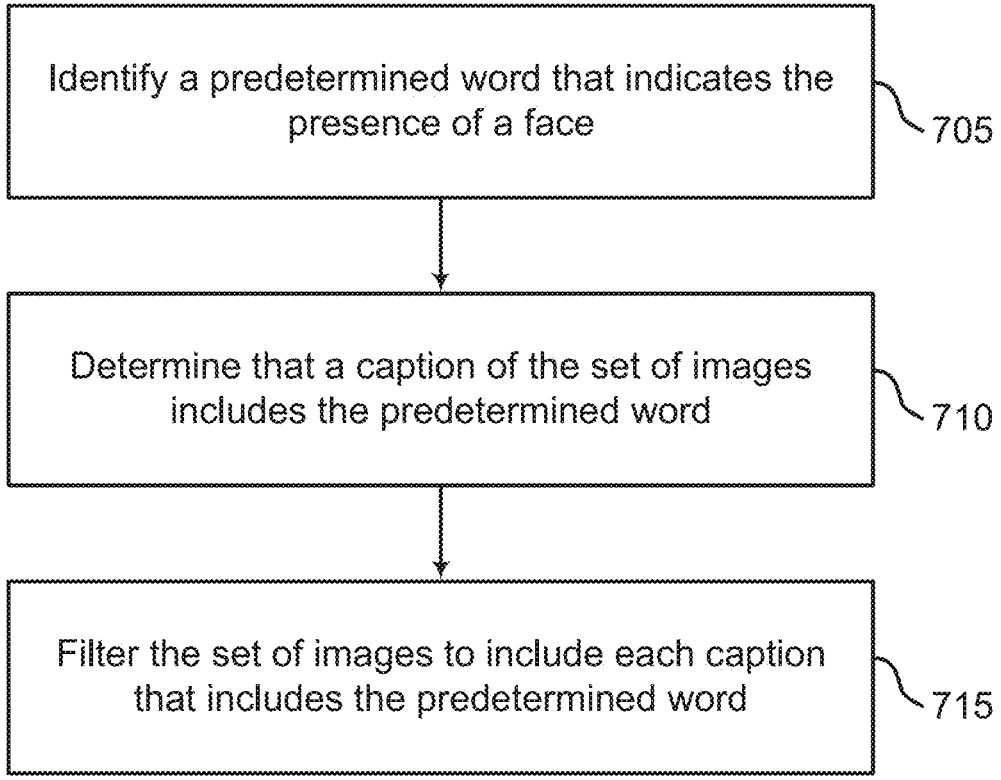
FIG. 7 shows an example of image filtering based on predetermined words according to aspects of the present disclosure.

At operation 105, a database as described with reference to FIG. 7 provides a set of annotated images including captions. For example, a machine learning apparatus as described with reference to FIGS. 8 and 9 retrieves the set of annotated images including captions from the database. In some embodiments, the annotated images are stored in the database as image files such as JPEG, DNG, PNG, TIFF, etc., that support metadata, and the captions are included in the image files as metadata. In some embodiments, the annotated images are stored as image files, and the captions are external text files that are associated with the image files according to a data schema. In some examples, the set of annotated images are retrieved from a stock photo database, or are retrieved through various web-crawling techniques.

At operation 110, the system crops the annotated images to obtain face crops. In some cases, the operations of this step refer to, or may be performed by, a machine learning apparatus as described with reference to FIGS. 8 and 9. For example, the machine learning apparatus may use a machine learning model to identify at least one region in each of the annotated images that includes a face and crop the region to produce a new image associated with the annotated image and the caption.

At operation 115, the system compares the face crops to the captions. In some cases, the operations of this step refer to, or may be performed by, a machine learning apparatus as described with reference to FIGS. 8 and 9. For example, the machine learning apparatus may use the machine learning model to compute a caption similarity score to compare against a predetermined caption similarity threshold. If the machine learning apparatus determines that the caption similarity score exceeds the caption similarity threshold, the machine learning apparatus annotates the face crop with the caption associated with the caption similarity score to obtain an annotated face image and adds the annotated face image to a training set. In at least one embodiment, if the caption similarity score does not exceed the caption similarity threshold, the machine learning apparatus extracts one or more phrases from the caption and determines if the face crop is similar to the one or more phrases based on a phrase similarity score. If the caption similarity score does exceed the caption similarity threshold, then the machine learning apparatus annotates the face crop with at least one of the phrases to obtain an annotated face image and includes the annotated face image in a training set of annotated face images.

Referring to FIG. 1, in an example, the annotated set of images includes an image that is captioned "Man smiling at a phone in a town". After cropping the face depicted in the annotated image, the machine learning apparatus has determined that the caption is not sufficiently similar to the face crop to use as a caption for the face crop. However, the machine learning apparatus extracts the phrase "Man smiling" from the original caption and determines that the phrase is sufficiently similar to the face crop for the phrase to annotate the face crop, and the face crop is annotated with the phrase and added to the training set.

At operation 120, the system provides the training set of annotated face images. In some cases, the operations of this step refer to, or may be performed by, a machine learning apparatus as described with reference to FIGS. 8 and 9. For example, after the machine learning apparatus generates the training set, the machine learning apparatus may provide the training set to a user for use in training an NLP face image captioning model. In at least one embodiment, a machine learning model of the machine learning apparatus includes the NLP face image captioning model, and the machine learning apparatus uses the training set as a ground-truth dataset for a training component of the machine learning apparatus to train the machine learning model.

Figure 2:
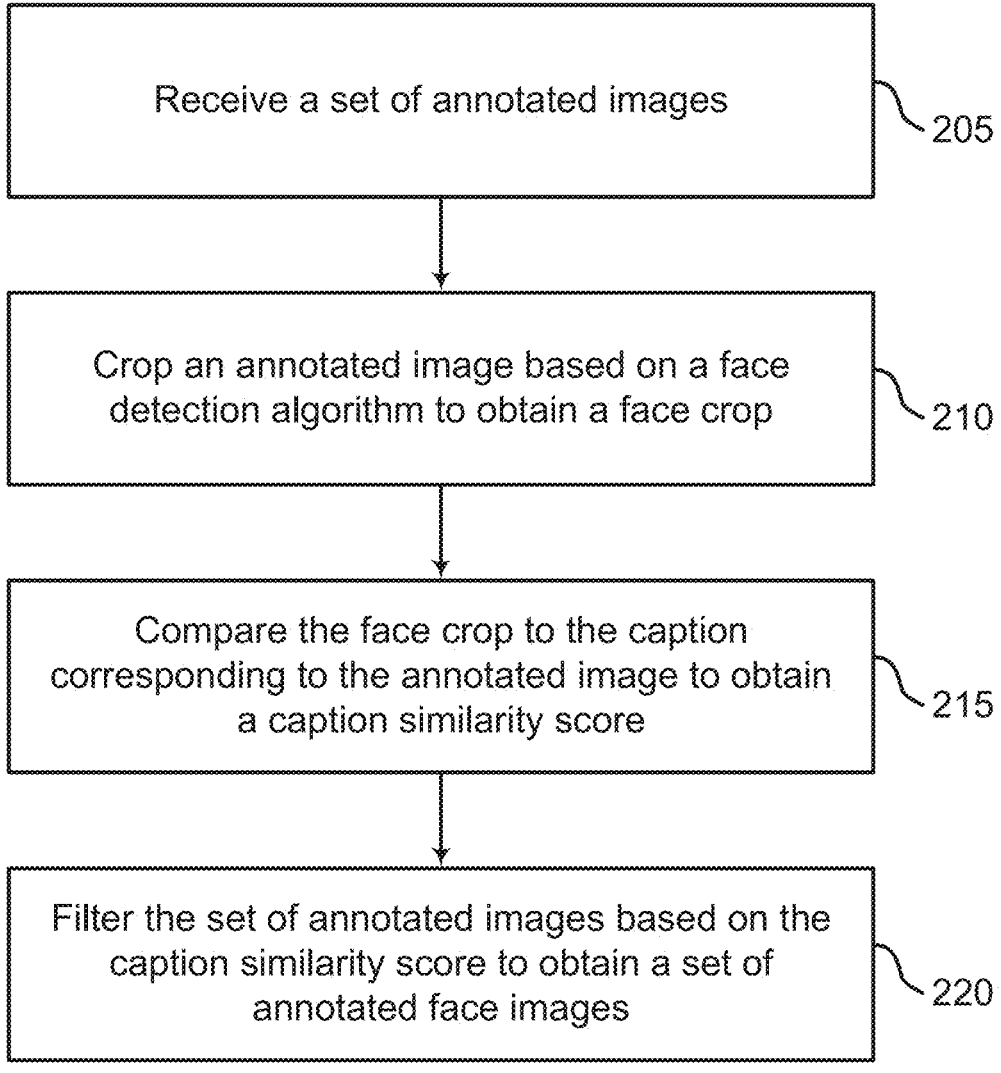
FIG. 2 shows an example of filtering annotated images based on similarity scores according to aspects of the present disclosure.

FIG. 2 shows an example of filtering annotated images based on similarity scores according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In the example of FIG. 2, a machine learning apparatus as described with reference to FIGS. 8 and 9 obtains a set of annotated face images in response to receiving a set of annotated images. Each annotated face image may be associated with a caption that is relevant to a face depicted in the annotated face image. An annotated face image is obtained by comparing a face cropped from an annotated image to the caption of the annotated image. If the face crop and the caption are sufficiently similar, then the face crop and caption pair are added to the set of annotated face images.

At operation 205, the system receives a set of annotated images. Each annotated image of the annotated images may include a caption. In some cases, the operations of this step refer to, or may be performed by, a face detection network as described with reference to FIGS. 9 and 10. For example, the face detection network of the machine learning apparatus may retrieve a set of annotated images from a database or other location where data is collected, such as a website. In some embodiments, the annotated images are stored in the database as image files such as JPEG, DNG, PNG, TIFF, etc., that support embedded metadata, and the captions are embedded in the image files as metadata. In some embodiments, the annotated images are stored as image files, and the captions are external files that are associated with the image files according to a data schema.

At operation 210, the system crops an annotated image of the set of annotated images based on a face detection algorithm to obtain a face crop. In some cases, the operations of this step refer to, or may be performed by, a face detection network as described with reference to FIGS. 8 and 9. In at least one embodiment, the face detection network crops the annotated images to obtain face crops as described with reference to FIG. 4. In at least one embodiment, the face detection network is pretrained to implement the face detection algorithm. The face detection algorithm may be a cascading classification algorithm or other algorithm suitable for detecting faces in images.

At operation 215, the system compares the face crop to the caption corresponding to the annotated image to obtain a caption similarity score. In some cases, the operations of this step refer to, or may be performed by, a comparison network as described with reference to FIGS. 8 and 9. In an example, the comparison network compares the face crop to the caption as described with reference to FIG. 5.

At operation 220, the system filters the set of annotated images based on the caption similarity score to obtain a set of annotated face images. In some cases, the operations of this step refer to, or may be performed by, a filtering component as described with reference to FIGS. 8 and 9. In an example, the filtering component filters the set of annotated images based on the caption similarity score to obtain a set of annotated face images as described with reference to FIG. 6.

Figure 3:
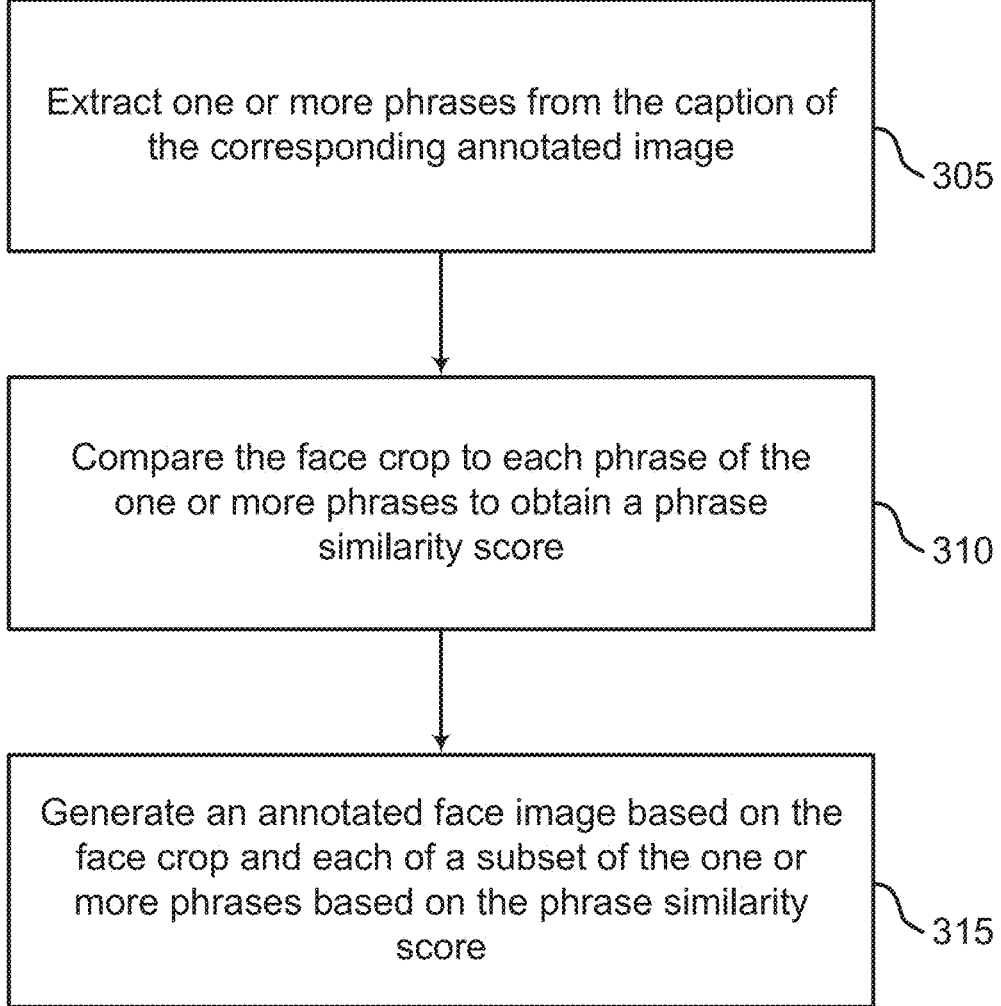
FIG. 3 shows an example of generating an annotated face image according to aspects of the present disclosure.

FIG. 3 shows an example of generating an annotated face image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Figure 6:
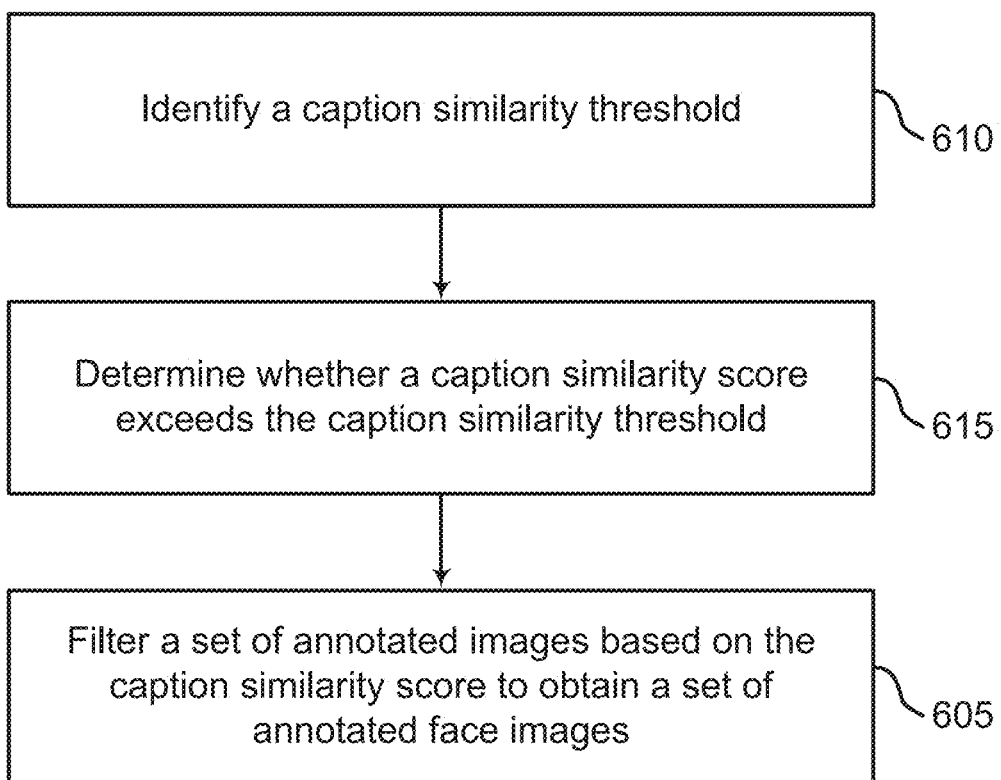
FIG. 6 shows an example of image filtering according to aspects of the present disclosure.

In the example of FIG. 3, the machine learning apparatus may generate an annotated face image for a face crop that is not included in the set of annotated face images as described with reference to FIGS. 2 and 6. In an example, a face crop that is associated with a caption similarity score equal to or lower than a caption similarity threshold as described with reference to FIG. 6 is not included in the set of annotated face images. In at least one embodiment, the machine learning apparatus performs further operations to determine if a matching caption can be generated for the face crop so that the face crop and caption pair can be included in the set of annotated face images.

At operation 305, the system extracts one or more phrases from the caption of the corresponding annotated image. In some cases, the operations of this step refer to, or may be performed by, a comparison network as described with reference to FIGS. 9 and 10. For example, the comparison network may extract the one or more phrases from a caption corresponding to an annotated image using natural language processing techniques such as named entity recognition, topic modeling, etc. In at least one embodiment, the comparison network includes a dependency parser network that extracts one or more phrases from the caption according to a dependency parser algorithm. A dependency parser algorithm analyzes the grammatic structure of input text to determine relationships between words in the text. Once the dependencies in the text are fully mapped, each word in the text is categorized based on their relation to text and to the other words in the text. The comparison network may then extract words from the caption based on their identified relationships.

In at least one embodiment, the comparison network performs operation 305 after the filtering component filters the plurality of annotated images based on the caption similarity score. For example, the comparison network may perform operation 305 after determining that a face crop is not associated with a caption similarity score that exceeds a caption similarity threshold as described with reference to FIG. 6. In this case, the caption is associated with an annotated image that is a parent image to the face crop (e.g., the annotated image from which the face crop is obtained). The face crop may be associated with the caption and the annotated image according to metadata or a data schema as described with reference to FIGS. 4-6.

At operation 310, the system compares the face crop to each phrase of the one or more phrases to obtain a phrase similarity score. In some cases, the operations of this step refer to, or may be performed by, a comparison network as described with reference to FIGS. 9 and 10. In an example, the comparison network may encode a phrase according to various text encoding techniques as described with reference to FIG. 5 to obtain a phrase embedding. This comparison network may likewise embed each phrase of the one or more phrases. The comparison network may compare each phrase embedding with the face crop embedding obtained as described with reference to FIG. 5 by computing a cosine similarity between the face crop embedding and the phrase embedding as described with reference to FIG. 5. In at least one embodiment, the comparison network obtains the phrase similarity score by designating the cosine similarity as the phrase similarity score. In at least one embodiment, the comparison network associates the phrase similarity score with the face crop and the phrase via metadata or a data schema as described with reference to FIGS. 4-6.

In at least one embodiment, the comparison network adds one or more pseudo-phrases to the one or more phrases. For example, the comparison network may add one or more pseudo-phrases such as "portrait", "face", or other word indicating the presence of a face, to the one or more phrases to obtain augmented phrases, embed the one or more augmented phrases, compute a softmax of all cosine similarities between the augmented phrase embeddings and the face crop embeddings, and multiply the softmax by 100.

At operation 315, the system generates an annotated face image based on the face crop and each of a subset of the one or more phrases based on the phrase similarity score. In some cases, the operations of this step refer to, or may be performed by, a filtering component as described with reference to FIGS. 9 and 10. In an example, the filtering component determines if the phrase similarity score exceeds a predetermined phrase similarity threshold. In at least one embodiment, the phrase similarity threshold is 0.26. When the filtering component determines that a phrase similarity score associated with the face crop and a phrase exceeds the phrase similarity threshold, the filtering component generates an annotated face image by annotating the face crop with the phrase via metadata or a data schema association and adds the annotated face crop to the set of annotated face images. The annotated face image may be annotated with each phrase of the one or more phrases associated with a phrase similarity score exceeding the phrase similarity threshold.

In at least one embodiment, the phrase similarity score is computed based on the one or more pseudo-phrases. For example, the filtering component may designate the softmax of the augmented phrase embeddings as the phrase similarity score, and may then determine if the phrase similarity score exceeds a predetermined phrase similarity threshold. In at least one embodiment, the phrase similarity threshold is 0.75. When the filtering component determines that the phrase similarity score associated with a face crop and an augmented phrases exceeds the phrase similarity threshold, the filtering component generates an annotated face image by annotating the face crop with the augmented phrase via metadata or a data schema association and adds the annotated face crop to the set of annotated face images. The annotated face image may be annotated with each augmented phrase of the one or more augmented phrases associated with a phrase similarity score exceeding the phrase similarity threshold.

Cropping

Figure 4:
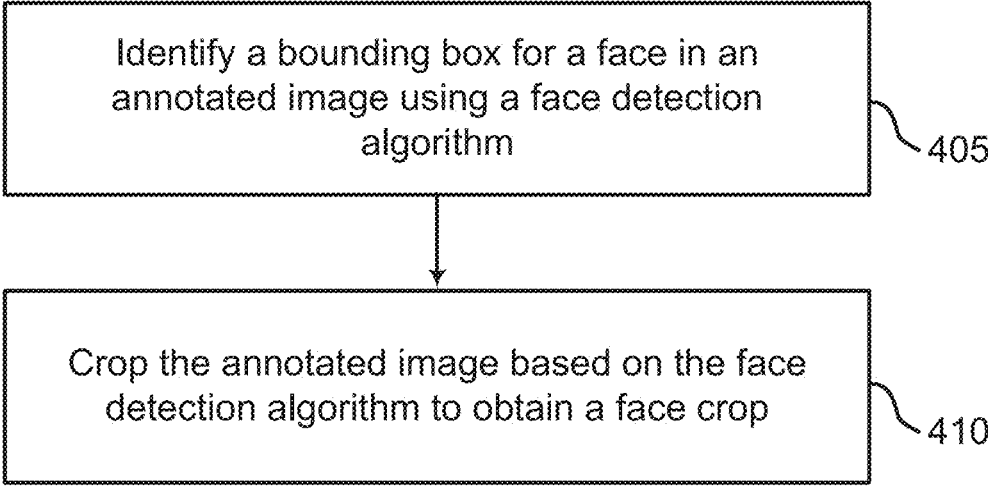
FIG. 4 shows an example of cropping an image according to aspects of the present disclosure.

FIG. 4 shows an example of cropping an image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system identifies a bounding box for a face in an annotated image using a face detection algorithm. In some cases, the operations of this step refer to, or may be performed by, a face detection network as described with reference to FIGS. 9 and 10. In an example, in response to retrieving a set of annotated images as described with reference to FIG. 2, a face detection network processes the annotated image to detect at least one face in the annotated image and returns a bounding box for a detected face. The bounding box indicates a region in the annotated image that corresponds to the detected face. The face detection network may be pre-trained to use the face detection algorithm to process images. For example, the face detection algorithm may be a cascading classification face detection algorithm. In at least one embodiment, the face detection network is a convolutional neural network (CNN). In at least one embodiment, the face detection network is a multi-task cascaded CNN (MTCNN).

At operation 410, the system crops the annotated image based on the face detection algorithm to obtain a face crop. In some cases, the operations of this step refer to, or may be performed by, a face detection network as described with reference to FIGS. 9 and 10. For example, after the face detection network identifies a region in the annotated image that corresponds to a face, the face detection network edits the annotated image by removing the portions of the annotated image that do not correspond to the region to obtain the face crop (e.g., an image that depicts only the portion of the annotated image that includes a face). The face algorithm may be adjusted to include more or less area of the annotated image in the region. The face detection network may include metadata in the face crop and/or in the annotated image that associates the face crop with the annotated image, or may add information to a data schema that associates the annotated image with its caption so that the face crop is associated with the annotated image and the caption. The face detection network may include the caption in the face crop as metadata that associates a face crop with a caption of a parent image, and/or may likewise associate the face crop with the caption in the data schema.

Comparing

Figure 5:
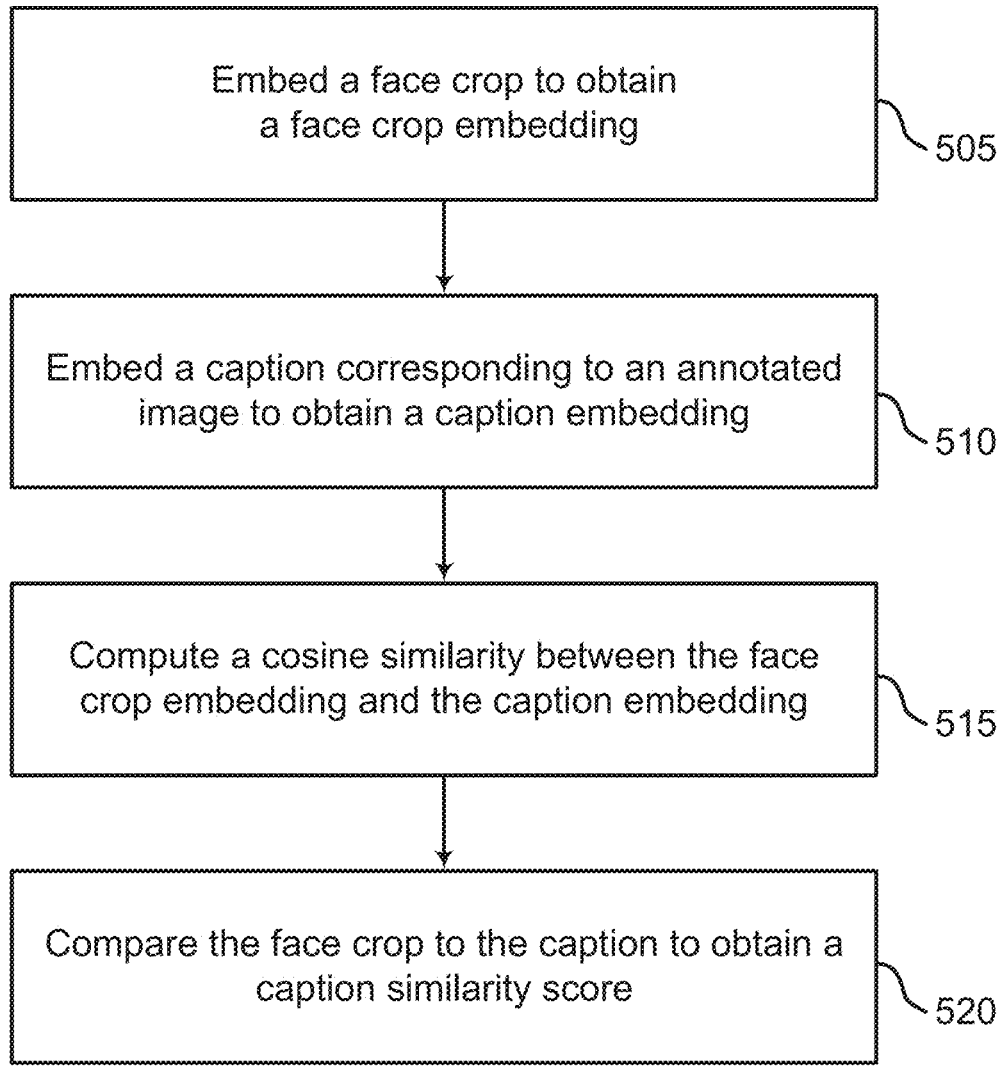
FIG. 5 shows an example of comparing a face crop to an annotated image according to aspects of the present disclosure.

FIG. 5 shows an example of comparing a face crop to an annotated image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system embeds a face crop to obtain a face crop embedding. In some cases, the operations of this step refer to, or may be performed by, a comparison network as described with reference to FIGS. 9 and 10. For example, after generating a face crop as described with reference to FIGS. 2 and 4, a face detection network provides the face crop as input to the comparison network. In response to receiving the face crop, the comparison network embeds the face crop by encoding the image according to an image encoding algorithm. The image encoding algorithm outputs the face crop embedding. In the neural network context, an embedding refers to a learned low-dimensional representation of discrete data as continuous vectors that can be used to compare one embedding with another (via nearest neighbors calculation), as input into a neural network, and/or visualizations. The image encoding algorithm outputs the continuous vectors according to the architecture of the comparison network. In at least one embodiment, the comparison network includes a convolutional neural network-based image encoder that generates the face crop embedding by processing the face crop input through a series of network layers that perform convolutional operations on an input.

At operation 510, the system embeds a caption corresponding to an annotated image to obtain a caption embedding. In some cases, the operations of this step refer to, or may be performed by, a comparison network as described with reference to FIGS. 9 and 10. For example, the comparison network retrieves the caption via metadata included in the face crop and/or the annotated image, or retrieves the caption from a database according to a data schema association as described with reference to FIG. 3. In response to retrieving the caption, the comparison network embeds the caption to obtain a caption embedding by encoding the caption according to a text encoding algorithm. The caption embedding is a word embedding, in which individual words of the caption are represented as real-valued vectors in a predefined vector space. The text encoding algorithm outputs the caption embedding according to the architecture of the comparison network. In at least one embodiment, the comparison network includes a pre-trained text encoder that embeds the caption to obtain the caption embedding by encoding the caption according to the text encoding algorithm.

In at least one embodiment, the face crop embedding and the caption embedding are located in a same embedding space. The term "embedding space" refers to a vector space that includes vector representations of inputs (i.e., embeddings). The comparison network may embed the face crop and the caption in a same embedding space using a multi-modal encoding algorithm in which a text encoder and an image encoder are pre-trained to respectively receive a text and image input and embed them in a same embedding space so that the text and image input may be compared with each other. In at least one embodiment, the comparison network is implemented as a Contrastive Language-Image Pre-training (CLIP) model.

At operation 515, the system computes a cosine similarity between the face crop embedding and the caption embedding. In some cases, the operations of this step refer to, or may be performed by, a comparison network as described with reference to FIGS. 9 and 10. In an example, the comparison network computes the cosine of the angle between the face crop embedding and the caption embedding to obtain a dot product of the face crop embedding and the caption embedding.

At operation 520, the system compares the face crop to the caption to obtain a caption similarity score. In some cases, the operations of this step refer to, or may be performed by, a comparison network as described with reference to FIGS. 9 and 10. In an example, the comparison network compares the face crop to the caption by computing the cosine similarity between the face crop embedding corresponding to the face crop and the caption embedding corresponding to the caption, and obtains the caption similarity score by designating the cosine similarity as the caption similarity score. The comparison network may add the caption similarity score to the face crop as metadata, and/or may add an association between the face crop, the caption, and the similarity score to the database according to the data schema.

Filtering

FIG. 6 shows an example of image filtering according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, the machine learning apparatus selects pairs of face crops and captions to include in an annotated face image set by filtering the pairs according to their similarity with each other.

At operation 610, the system identifies a caption similarity threshold. In some cases, the operations of this step refer to, or may be performed by, a filtering component as described with reference to FIGS. 9 and 10. The filtering component may identify the caption similarity threshold in response to a command from a user or according to a predetermined instruction. The caption similarity threshold corresponds to a possible caption similarity score. In at least one embodiment, the caption similarity threshold is a caption similarity score of 0.3.

At operation 615, the system determines whether a caption similarity score exceeds the caption similarity threshold. In some cases, the operations of this step refer to, or may be performed by, a filtering component as described with reference to FIGS. 9 and 10. In an example, after a comparison network obtains a caption similarity score corresponding to a face crop and caption as described with reference to FIG. 5, the filtering component determines if the caption similarity score is greater than the caption similarity threshold.

At operation 605, the system filters a set of annotated images based on the caption similarity score to obtain a set of annotated face images. In some cases, the operations of this step refer to, or may be performed by, a filtering component as described with reference to FIGS. 9 and 10. For example, if the caption similarity score exceeds the caption similarity threshold, the filtering component annotates the face crop with the caption by updating the metadata of the face crop so that the caption is associated with the face crop rather than its parent image, and/or may likewise update the association in the data schema. The filtering component then adds the annotated face crop to a set of annotated face images. The filtering component may add other annotated face crops obtained in a similar manner as described with reference to FIGS. 2-6 to the set of annotated face images. The filtering component may store the set of annotated face images in a database as described with reference to FIG. 8.

FIG. 7 shows an example of image filtering based on predetermined words according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 7, the machine learning apparatus selects pairs of face crops and captions to include in an annotated face image set by filtering annotated images based on whether their captions include certain words that indicate the presence of a face in the image.

At operation 705, the system identifies a predetermined word that indicates the presence of a face. In some cases, the operations of this step refer to, or may be performed by, a filtering component as described with reference to FIGS. 9 and 10. The filtering component may identify one or more predetermined words in response to a command from a user or according to a predetermined instruction. For example, the predetermined word may be "portrait", "face", etc.

At operation 710, the system determines that a caption of the set of annotated images includes the predetermined word. In some cases, the operations of this step refer to, or may be performed by, a filtering component as described with reference to FIGS. 9 and 10. For example, the filtering component may retrieve the captions associated with the annotated images and may parse the captions to determine if any captions include a word that matches at least one predetermined word.

At operation 715, the system filters the set of annotated images to include each caption that includes the predetermined word. In some cases, the operations of this step refer to, or may be performed by, a filtering component as described with reference to FIGS. 9 and 10. For example, the filtering component may set a flag in the metadata of an annotated image including a caption that includes a predetermined word, or may set the flag in the data schema. The machine learning model may generate a face crop as described with reference to FIGS. 2 and 4. In at least one embodiment, the filtering component may check if the flag has been set in the annotated image associated with the face crop. If it has, the filtering component may associate the face crop with the caption to obtain an annotated face crop as described with reference to FIG. 6 and add the annotated face crop to the set of annotated face images.

System Architecture

Figure 8:
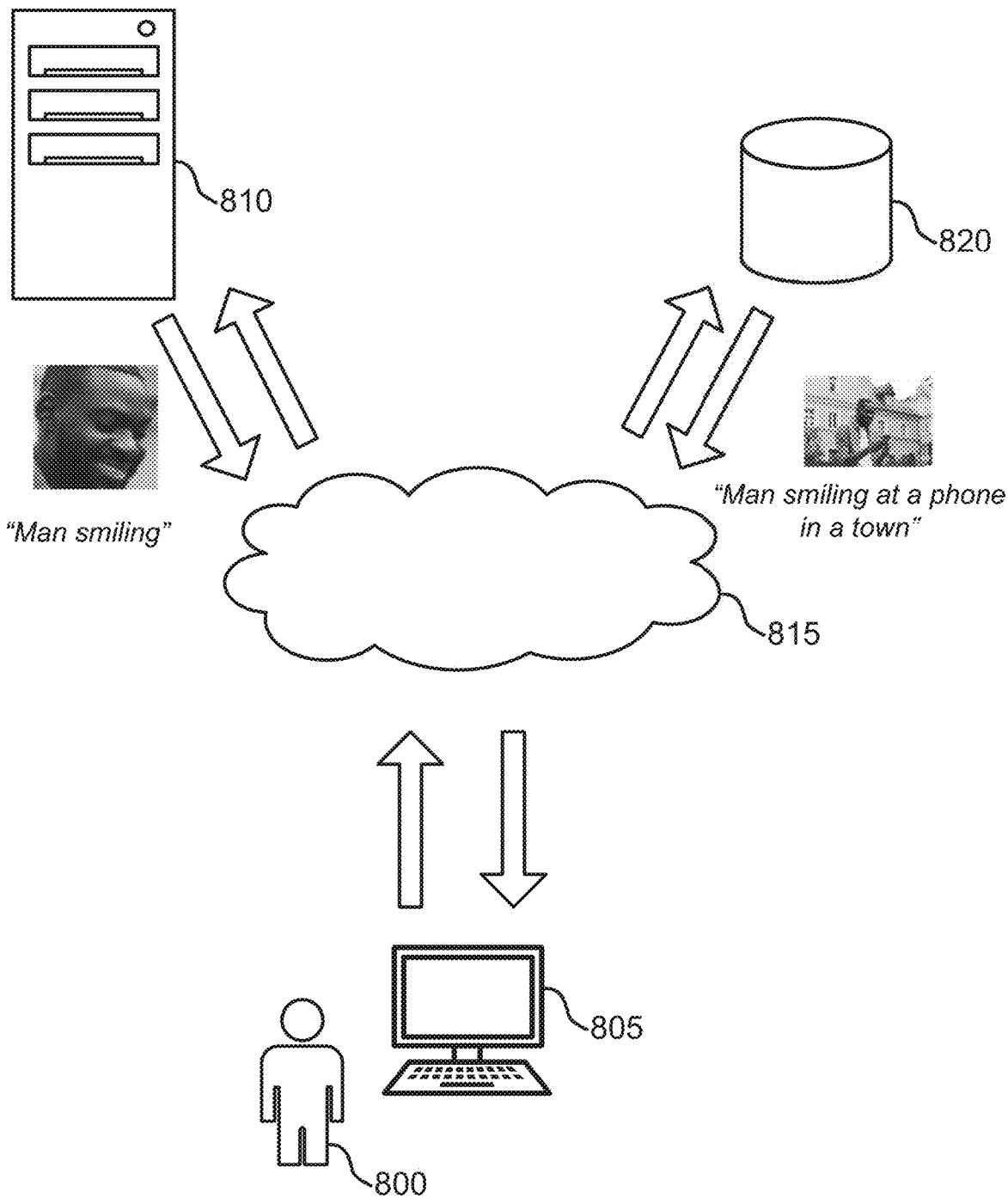
FIG. 8 shows an example of a face annotation system according to aspects of the present disclosure.
Figure 9:
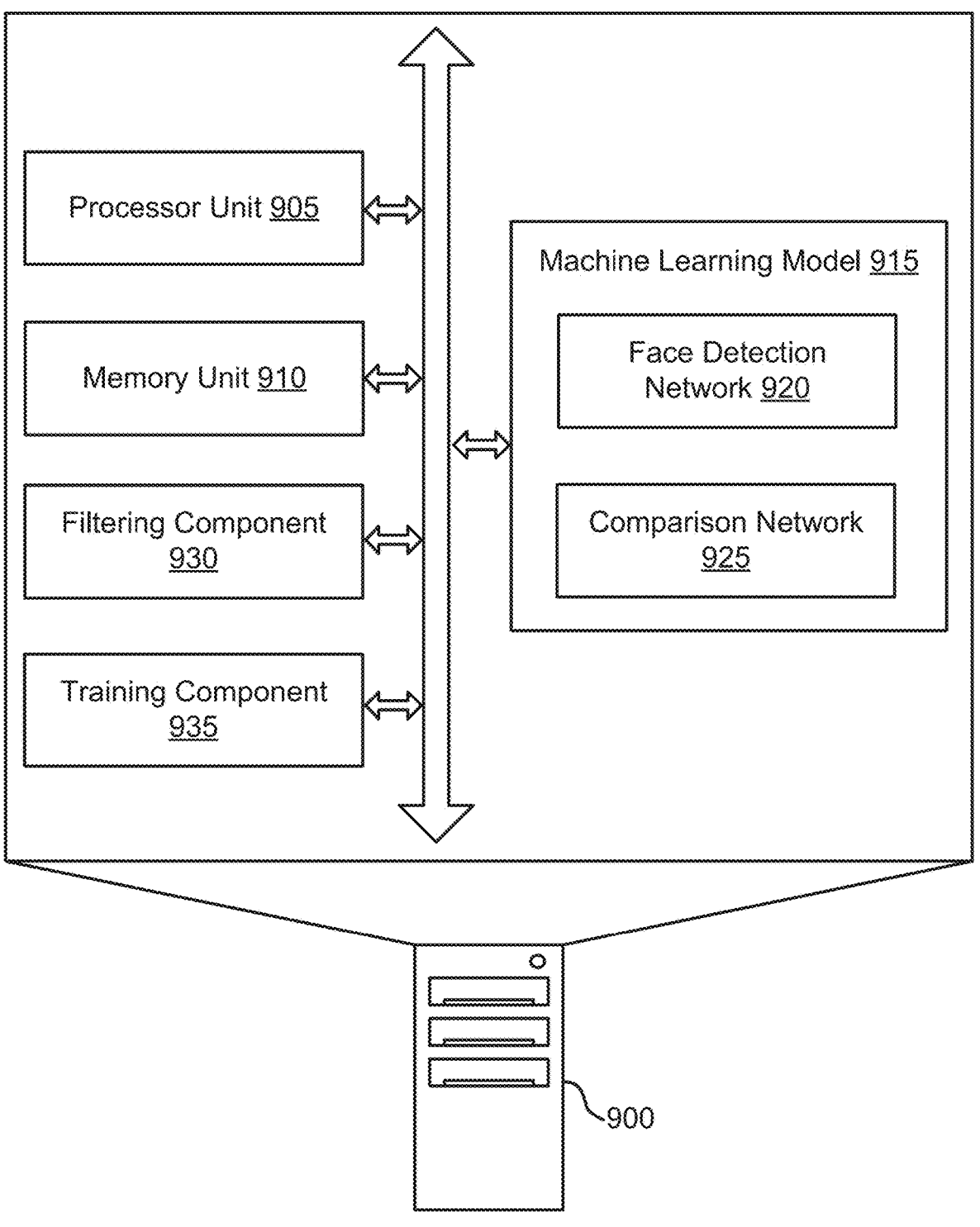
FIG. 9 shows an example of a machine learning apparatus according to aspects of the present disclosure.
Figure 10:
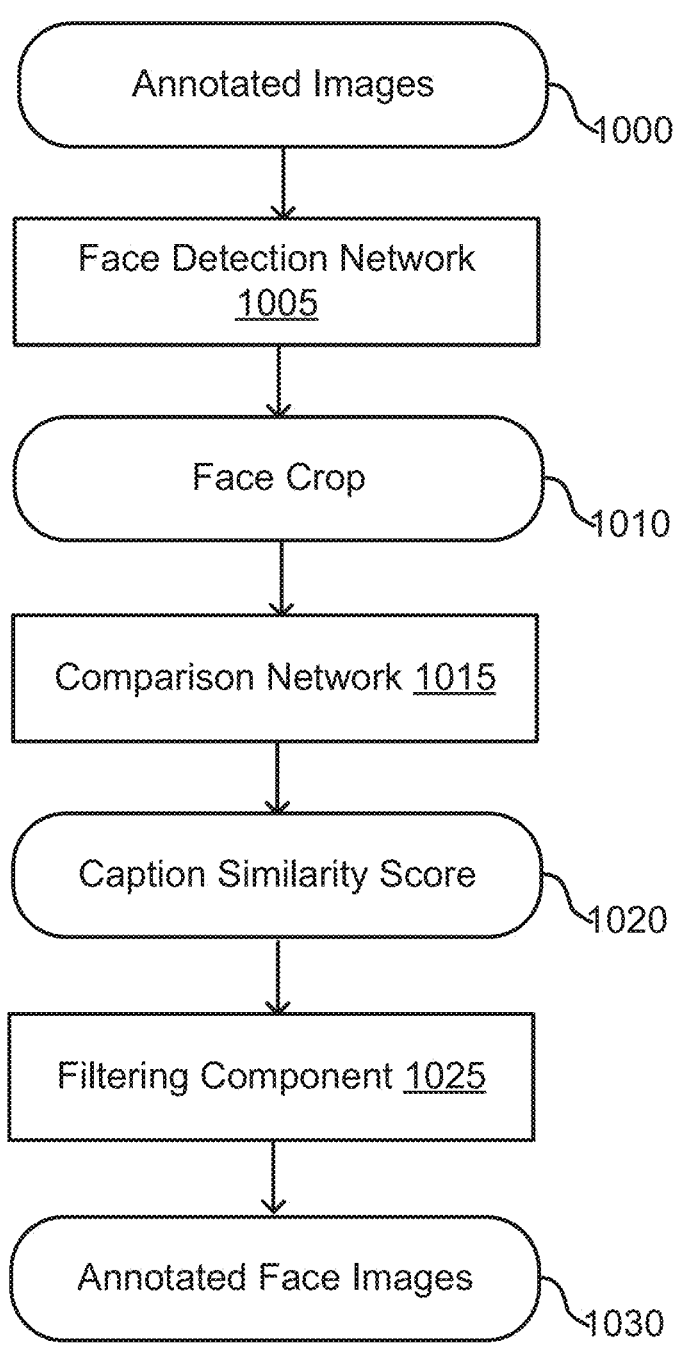
FIG. 10 shows an example of filtering annotated images according to aspects of the present disclosure.

In FIGS. 8-10, an apparatus for face annotation is described. One or more aspects of the apparatus include a face detection network configured to crop each annotated image of a plurality of annotated images to obtain a face crop; a comparison network configured to compare the face crop to a caption corresponding to the annotated image to obtain a caption similarity score; and a filtering component configured to filter the plurality of annotated images based on the caption similarity score to obtain a plurality of annotated face images.

In some aspects, the face detection network includes a convolutional neural network (CNN). In some aspects, the comparison network includes a multi-modal encoder. In some aspects, the multi-modal encoder is a Contrastive Language-Image Pre-training (CLIP) network. Some examples of the apparatus, system, and method further include a training component configured to update a machine learning model using the plurality of annotated face images.

FIG. 8 shows an example of a face annotation system according to aspects of the present disclosure. The example shown includes user 800, user device 805, machine learning apparatus 810, cloud 815, and database 820.

Referring to FIG. 8, machine learning apparatus 810 may retrieve a set of annotated images from database 820 or another source, such as from a dedicated stock photo website or by web-crawling. Machine learning apparatus 810 may use a machine learning model to crop an annotated image to produce a face crop and compare the face crop to a caption associated with the annotated image, and may generate a set of annotated face images based on the comparison and provide the set of annotated face images to user 800 via user device 805, another computing device, or a database such as database 820 via cloud 815.

User device 805 may be a personal computer, laptop computer, mainframe computer, palmtop computer, personal assistant, mobile device, or any other suitable processing apparatus. In some examples, user device 805 includes software that can retrieve and display a set of images, such as annotated face images provided by machine learning apparatus 810.

A user interface may enable user 800 to interact with user device 805. In some embodiments, the user interface may include an audio device, such as an external speaker system, an external display device such as a display screen, or an input device (e.g., a remote control device interfaced with the user interface directly or through an IO controller module). In some cases, the user interface may be a graphical user interface (GUI).

Machine learning apparatus 810 may include a computer implemented network that includes a machine learning model including one or more neural networks. Machine learning apparatus 810 may also include one or more processors, a memory subsystem, a communication interface, an I/O interface, one or more user interface components, and a bus. Additionally, machine learning apparatus 810 may communicate with user device 805 and database 820 via cloud 815.

In some cases, machine learning apparatus 810 is implemented on a server. A server provides one or more functions to users linked by way of one or more of various networks, such as cloud 815. In some cases, the server includes a single microprocessor board, which includes a microprocessor responsible for controlling all aspects of the server. In some cases, a server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Further detail regarding the architecture of machine learning apparatus is provided with reference to FIGS. 9-10. Further detail regarding a process for face annotation is provided with reference to FIGS. 1-7. Further detail regarding a process for training the machine learning model is provided with reference to FIGS. 11-12. Machine learning apparatus 810 is an example of, or includes aspects of, the corresponding element described with reference to FIG. 9.

A cloud such as cloud 815 is a computer network configured to provide on-demand availability of computer system resources, such as data storage and computing power. In some examples, cloud 815 provides resources without active management by user 800. The term "cloud" is sometimes used to describe data centers available to many users over the Internet. Some large cloud networks have functions distributed over multiple locations from central servers. A server is designated an edge server if it has a direct or close connection to a user. In some cases, cloud 815 is limited to a single organization. In other examples, cloud 815 is available to many organizations. In one example, cloud 815 includes a multi-layer communications network comprising multiple edge routers and core routers. In another example, cloud 815 is based on a local collection of switches in a single physical location. Cloud 815 may provide communications between user device 805, machine learning apparatus 810, and database 820.

A database such as database 820 is an organized collection of data. For example, database 820 stores data in a specified format known as a schema. Database 820 may be structured as a single database, a distributed database, multiple distributed databases, or an emergency backup database. In some cases, a database controller may manage data storage and processing in database 620. In some cases, user 800 interacts with the database controller. In other cases, the database controller may operate automatically without user interaction. Database may store information such as the set of annotated images, the face crops generated by machine learning apparatus 810, the set of annotated face images generated by machine learning apparatus 810, and associations between a caption, a phrase, an image, and a face crop.

FIG. 9 shows an example of a machine learning apparatus according to aspects of the present disclosure. Machine learning apparatus 900 is an example of, or includes aspects of, the corresponding element described with reference to FIG. 8. In one aspect, machine learning apparatus 900 includes processor unit 905, memory unit 910, machine learning model 915, filtering component 930, and training component 935.

Processor unit 905 includes one or more processors. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 905 is configured to operate a memory array using a memory controller. In other cases, a memory controller is integrated into processor unit 905. In some cases, processor unit 905 is configured to execute computer-readable instructions stored in memory unit 910 to perform various functions. In some embodiments, processor unit 905 includes special purpose components for modem processing, baseband processing, digital signal processing, or transmission processing.

Memory unit 910 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 905 to perform various functions described herein. In some cases, memory unit 910 contains, among other things, a basic input/output system (BIOS) which controls basic hardware or software operation such as the interaction with peripheral components or devices. In some cases, memory unit 910 includes a memory controller that operates memory cells of memory unit 910. For example, the memory controller may include a row decoder, column decoder, or both. In some cases, memory cells within memory unit 910 store information in the form of a logical state.

Machine learning model 915 may include one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In one aspect, machine learning model 915 includes face detection network 920 and comparison network 925. Each of face detection network 920 and comparison network 925 may include one or more ANNs.

According to some aspects, face detection network 920 receives a set of annotated images, where each annotated image of the annotated images includes a caption. In some examples, face detection network 920 crops the annotated image based on a face detection algorithm to obtain a face crop. In some examples, face detection network 920 identifies a bounding box for a face in the annotated image using the face detection algorithm, where the cropping is based on the bounding box.

According to some aspects, face detection network 920 is configured to crop each annotated image of a plurality of annotated images to obtain a face crop. In some aspects, the face detection network 920 includes a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. Face detection network 920 is an example of, or includes aspects of, the corresponding element described with reference to FIG. 10.

According to some aspects, comparison network 925 compares the face crop to the caption corresponding to the annotated image to obtain a caption similarity score. In some examples, comparison network 925 embeds the face crop to obtain a face crop embedding. In some examples, comparison network 925 embeds the caption to obtain a caption embedding, where the comparing is between the face crop embedding and the caption embedding. In some aspects, the face crop embedding and the caption embedding are located in a same embedding space. In some examples, comparison network 925 computes a cosine similarity between the face crop embedding and the caption embedding, where the caption similarity score is based on the cosine similarity.

In some examples, comparison network 925 extracts one or more phrases from the caption of the corresponding annotated image. In some examples, comparison network 925 compares the face crop to each phrase of the one or more phrases to obtain a phrase similarity score.

In some examples, comparison network 925 embeds the face crop to obtain a face crop embedding. In some examples, comparison network 925 embeds the phrase to obtain a phrase embedding, where the comparing is between the face crop embedding and the phrase embedding. In some examples, comparison network 925 adds one or more pseudo-phrases to the one or more phrases, where the phrase similarity score is computed based on the one or more pseudo-phrases.

According to some aspects, comparison network 925 compares a face crop of the annotated image to the caption corresponding to the annotated image to obtain a caption similarity score. In some examples, comparison network 925 predicts a caption for a face image. In some examples, comparison network 925 embeds the face crop to obtain a face crop embedding. In some examples, comparison network 925 embeds the caption to obtain a caption embedding, where the comparing is between the face crop embedding and the caption embedding.

In some examples, comparison network 925 extracts one or more phrases from the caption of the corresponding annotated image. In some examples, comparison network 925 compares the face crop to each phrase of the one or more phrases to obtain a phrase similarity score. In some examples, comparison network 925 generates an annotated face image based on the face crop and each of a subset of the one or more phrases based on the phrase similarity score. In some examples, comparison network 925 embeds the face crop to obtain a face crop embedding. In some examples, comparison network 925 embeds the phrase to obtain a phrase embedding, where the comparing is between the face crop embedding and the phrase embedding.

According to some aspects, comparison network 925 is configured to compare the face crop to a caption corresponding to the annotated image to obtain a caption similarity score. In some aspects, the comparison network 925 includes a multi-modal encoder. The term "multi-modal encoder" refers to an encoder that operates with different modalities of input information. For example, a multi-modal encoder may be capable of receiving an image and text as input, and encoding the image and the text in a same embedding space.

In some aspects, the multi-modal encoder is a Contrastive Language-Image Pre-training (CLIP) network. CLIP is an example of a multi-modal encoder that is trained to efficiently learn visual concepts from natural language supervision. CLIP is a neural network that can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the model's text encoder. The model can then output a linear classifier of CLIP's visual representations.

Comparison network 925 is an example of, or includes aspects of, the corresponding element described with reference to FIG. 10.

According to some aspects, filtering component 930 filters the set of annotated images based on the caption similarity score to obtain a set of annotated face images. In some examples, filtering component 930 identifies a caption similarity threshold. In some examples, filtering component 930 determines whether the caption similarity score exceeds the caption similarity threshold, where the filtering is based on the determination.

In some examples, filtering component 930 identifies a predetermined word that indicates the presence of a face. In some examples, filtering component 930 determines that a caption of the set of annotated images includes the predetermined word. In some examples, filtering component 930 filters the set of annotated images to include each caption that includes the predetermined word.

According to some aspects, filtering component 930 filters the set of annotated images based on the caption similarity score to obtain a set of annotated face images. In some examples, filtering component 930 generates an annotated face image based on the face crop and each of a subset of the one or more phrases based on the phrase similarity score.

According to some aspects, filtering component 930 is configured to filter the plurality of annotated images based on the caption similarity score to obtain a plurality of annotated face images. Filtering component 930 is an example of, or includes aspects of, the corresponding element described with reference to FIG. 10. Filtering component 930 may be implemented as a hardware circuit, in firmware, or as a software component.

According to some aspects, training component 935 receives a set of annotated images, where each annotated image of the annotated images includes a caption. In some examples, training component 935 trains machine learning model 915 using the set of annotated face images.

In some examples, training component 935 computes a loss function by comparing the caption to the face image. In some examples, training component 935 updates the parameters of the machine learning model 915 based on the loss function.

According to some aspects, training component 935 is configured to update machine learning model 915 using the plurality of annotated face images. Training component 935 may be implemented as a hardware circuit, in firmware, or as a software component.

FIG. 10 shows an example of filtering annotated images according to aspects of the present disclosure. The example shown includes annotated images 1000, face detection network 1005, face crop 1010, comparison network 1015, caption similarity score 1020, filtering component 1025, and annotated face images 1030.

Referring to FIG. 10, face detection network 1005 receives plurality of annotated images 1000 and crops an image of annotated images 1000 to generate face crop 1010. Comparison network 1015 receives face crop 1010 and a caption associated with face crop 1010 and plurality of annotated images 1000 and computes caption similarity score 1020 based on face crop 1010 and the caption. Filtering component 1025 receives caption similarity score 1020, and based on a caption similarity score threshold, determines if face crop 1010 and the caption should be added to annotated face images 1030. If caption similarity score 1020 exceeds the caption similarity score threshold, filtering component 1025 annotates face crop 1010 with the caption to obtain an annotated face image and adds the annotated face image to annotated face images 1030.

Face detection network 1005 is an example of, or includes aspects of, the corresponding element described with reference to FIG. 9. Comparison network 1015 is an example of, or includes aspects of, the corresponding element described with reference to FIG. 9. Filtering component 1025 is an example of, or includes aspects of, the corresponding element described with reference to FIG. 9.

Training

Figure 11:
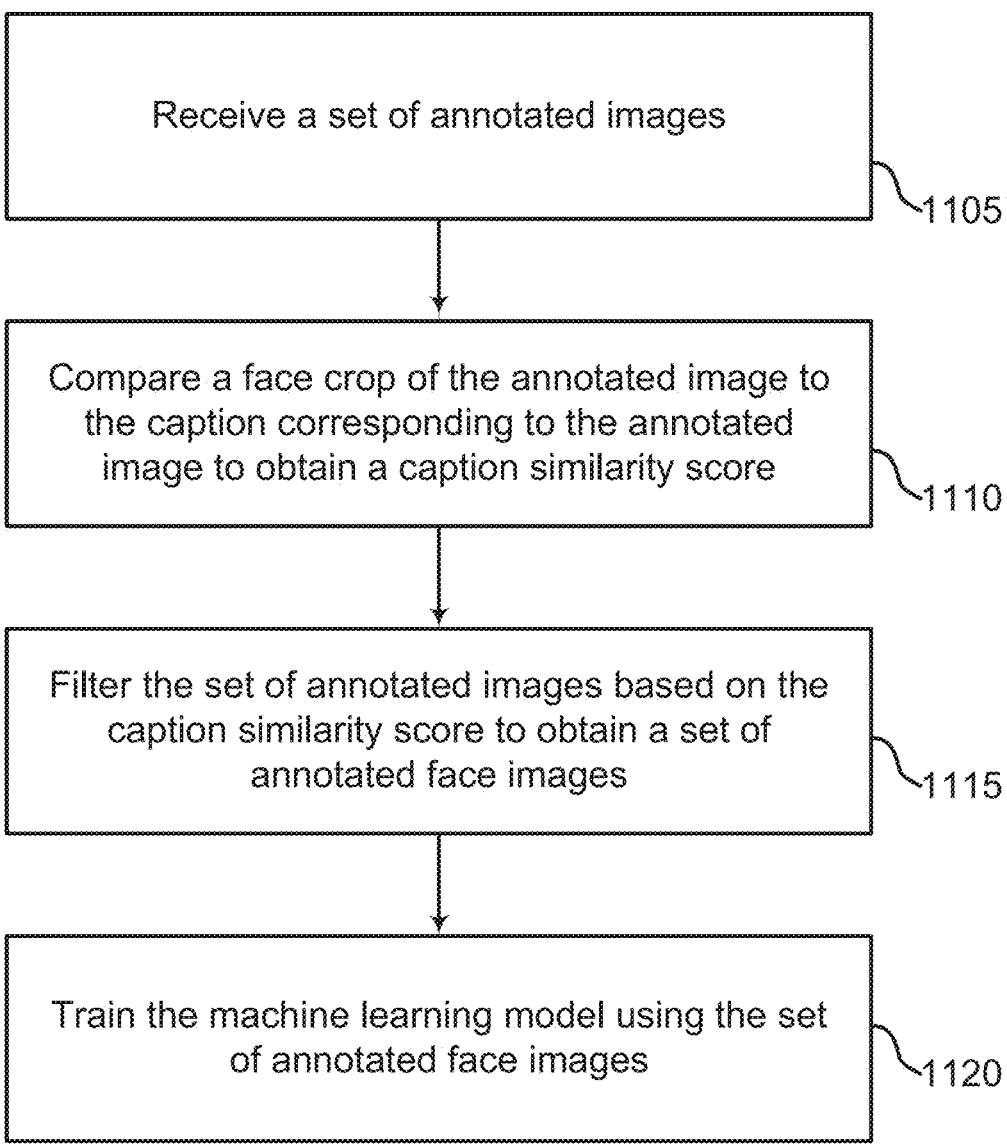
FIG. 11 shows an example of training a machine learning model according to aspects of the present disclosure.
Figure 12:
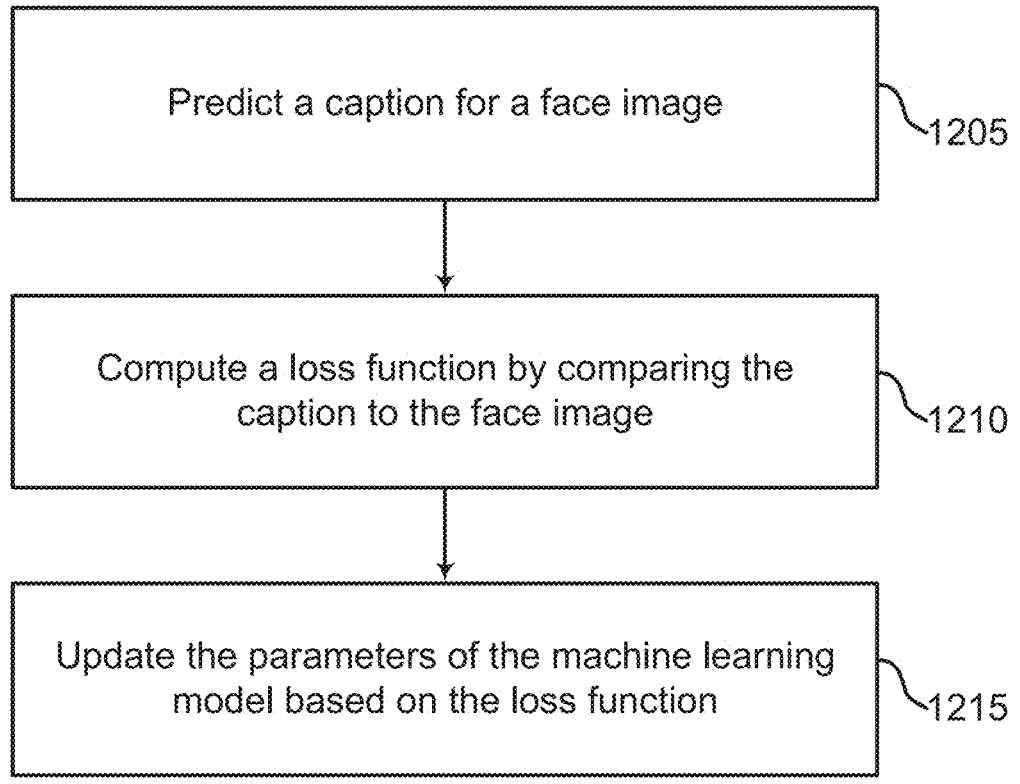
FIG. 12 shows an example of computing a loss function according to aspects of the present disclosure.

In FIGS. 11-12, a method for face annotation is described. One or more aspects of the method include receiving a plurality of annotated images, wherein each annotated image of the annotated images comprises a caption; comparing a face crop of the annotated image to the caption corresponding to the annotated image to obtain a caption similarity score; filtering the plurality of annotated images based on the caption similarity score to obtain a plurality of annotated face images; and training the machine learning model using the plurality of annotated face images.

Some examples of the method further include predicting a caption for a face image. Some examples further include computing a loss function by comparing the caption to the face image. Some examples further include updating the parameters of the machine learning model based on the loss function.

Some examples of the method further include embedding the face crop to obtain a face crop embedding. Some examples further include embedding the caption to obtain a caption embedding, wherein the comparing is between the face crop embedding and the caption embedding.

Some examples of the method further include extracting one or more phrases from the caption of the corresponding annotated image. Some examples further include comparing the face crop to each phrase of the one or more phrases to obtain a phrase similarity score. Some examples further include generating an annotated face image based on the face crop and each of a subset of the one or more phrases based on the phrase similarity score.

Some examples of the method further include embedding the face crop to obtain a face crop embedding. Some examples further include embedding the phrase to obtain a phrase embedding, wherein the comparing is between the face crop embedding and the phrase embedding.

FIG. 11 shows an example of training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 11, a training component trains a machine learning model as described with reference to FIG.

9 so that the machine learning model learns to predict a caption for an image depicting a face. For example, the machine learning model may use the set of annotated face images that are generated as described with reference to FIGS. 2-7 as a ground truth data set to compare against predicted captions for face crops in the set of annotated face images.

At operation 1105, the system receives a set of annotated images. In some cases, the operations of this step refer to, or may be performed by, a training component as described with reference to FIG. 9. In an example, the training component receives the set of annotated images in a similar manner as the face detection network as described with reference to FIG. 2.

At operation 1110, the system compares a face crop of the annotated image to the caption corresponding to the annotated image to obtain a caption similarity score. In some cases, the operations of this step refer to, or may be performed by, a comparison network as described with reference to FIGS. 9 and 10. In an example, a face detection network as described with reference to FIGS. 9 and 10 obtains the face crop of the annotated image as described with reference to FIGS. 2 and 4 and provides the face crop to the comparison network. In the example, the comparison network obtains the caption similarity score by comparing the face crop to the caption as described with reference to FIGS. 2-3 and 5.

At operation 1115, the system filters the set of annotated images based on the caption similarity score to obtain a set of annotated face images. In some cases, the operations of this step refer to, or may be performed by, a filtering component as described with reference to FIGS. 9 and 10. In an example, the filtering component obtains the set of annotated images by filtering the set of images based on the caption similarity score as described with reference to FIGS. 2 and 6-7. In at least one embodiment, the filtering component obtains the set of annotated images by filtering the set of images based on a phrase similarity score as described with reference to FIG. 3.

At operation 1120, the system trains the machine learning model using the set of annotated face images. In some cases, the operations of this step refer to, or may be performed by, a training component as described with reference to FIG. 9. In an example, the training component trains the machine learning model using the set of annotated face images as described with reference to FIG. 12.

FIG. 12 shows an example of computing a loss function according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 12, the machine learning model is trained to output a caption for an image depicting a face based on a loss function determined by a predicted caption for the image and the image caption that is included in the set of annotated face images as described with reference to FIG. 11.

At operation 1205, the system predicts a caption for a face image. In some cases, the operations of this step refer to, or may be performed by, a comparison network as described with reference to FIGS. 9 and 10. The face image may be a face crop included in the set of annotated face images that is generated as described with reference to FIG. 11. In an example, the comparison network includes a deep learning-based vision-language model that is pre-trained to generate a caption for a face image by extracting features from the image and generating a caption that describes the extracted feature.

At operation 1210, the system computes a loss function by comparing the caption to the face image. In some cases, the operations of this step refer to, or may be performed by, a training component as described with reference to FIG. 9. The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration. In an example, the training component computes a loss function based on the predicted caption for the face image and the caption included in the annotated face image.

At operation 1215, the system updates the parameters of the machine learning model based on the loss function. In some cases, the operations of this step refer to, or may be performed by, a training component as described with reference to FIG. 9. For example, the training component adjusts the parameters of the comparison network to attempt to minimize the loss between the predicted caption for the face image and the caption included in the annotated face image. The operations of FIG. 12 are iteratively repeated for each face image in the set of annotated face images until the respective losses are minimized.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for face annotation, comprising:
receiving an annotated image and a caption corresponding to the annotated image, wherein the caption includes a plurality of phrases;
generating a face image by cropping the annotated image based on a face detection algorithm;
extracting a phrase of the plurality of phrases from the caption;
computing a phrase similarity score by comparing an image embedding of the face image to a phrase embedding of the phrase in a multi-modal embedding space; and
adding the face image with the phrase to a set of annotated face images based on the phrase similarity score.

2. The method of claim 1, wherein generating the face image comprises:
identifying a bounding box for a face in the annotated image using the face detection algorithm; and
cropping the annotated image based on the bounding box.

3. The method of claim 1, further comprising:
embedding the face image using a multi-modal encoder to obtain the image embedding; and
embedding the phrase using the multi-modal encoder to obtain the phrase embedding.

4. The method of claim 1, wherein computing the phrase similarity score comprises:
computing a cosine similarity between the image embedding and the phrase embedding, wherein the phrase similarity score is based on the cosine similarity.

5. The method of claim 1, wherein adding the face image with the phrase to the set of annotated face images comprises:

identifying a phrase similarity threshold; and
determining that the phrase similarity score exceeds the phrase similarity threshold.

6. The method of claim 1, further comprising:
generating an additional face image based on an additional annotated image corresponding to an additional caption;
determining that the additional caption includes a predetermined word that indicates the presence of a face; and
adding the additional face image and the additional caption to the set of annotated face images based on the determination.

7. The method of claim 1, further comprising:
generating an additional face image based on an additional annotated image corresponding to an additional caption;
computing an additional phrase similarity score by comparing the additional face image to the phrase; and
adding the additional face image with the phrase to the set of annotated face images based on the additional phrase similarity score.

8. The method of claim 7, further comprising:
embedding the additional face image to obtain an additional image embedding,
wherein the additional phrase similarity score is computed based on the additional image embedding and the phrase embedding.

9. The method of claim 7, further comprising:
comparing the additional face image to the caption to obtain a caption similarity score; and
determining that the caption similarity score does not exceed a caption similarity threshold, wherein the extraction is based on the determination.

10. The method of claim 1, further comprising:
adding a pseudo-phrase to the phrase, where the phrase similarity score is computed based on the pseudo-phrase.

11. An apparatus for face annotation, comprising:
a face detection network configured to generate a face image by cropping an annotated image based on a face detection algorithm;
a comparison network configured to compute a phrase similarity score by comparing an image embedding of the face image to a phrase embedding of a phrase of a plurality of phrases extracted from a caption corresponding to the annotated image in a multi-modal embedding space; and
a filtering component configured to add the face image with the phrase to a set of annotated face images based on the phrase similarity score.

12. The apparatus of claim 11, wherein:
the face detection network includes a convolutional neural network (CNN).

13. The apparatus of claim 11, wherein:
the comparison network includes a multi-modal encoder.

14. The apparatus of claim 13, wherein:
the multi-modal encoder is a Contrastive Language-Image Pre-training (CLIP) network.

15. The apparatus of claim 11, further comprising:
a training component configured to update a machine learning model using the set of annotated face images.

16. A non-transitory computer readable medium storing code for face annotation, the code comprising instructions that, when executed by at least one processor, cause the at least one processor to perform operations comprising:

receiving an annotated image and a caption corresponding to the annotated image, wherein the caption includes a plurality of phrases;

generating a face image by cropping the annotated image based on a face detection algorithm;

extracting a phrase of the plurality of phrases from the caption;

computing a phrase similarity score by comparing an image embedding of the face image to a phrase embedding of the phrase in a multi-modal embedding space; and adding the face image with the phrase to a set of annotated face images based on the phrase similarity score.

17. The non-transitory computer readable medium of claim 16, wherein adding the face image with the phrase to the set of annotated face images comprises:

identifying a phrase similarity threshold; and determining that the phrase similarity score exceeds the phrase similarity threshold.

18. The non-transitory computer readable medium of claim 16, the code further comprising instructions that, when executed by the at least one processor, cause the at least one processor to perform operations comprising:

generating an additional face image based on an additional annotated image corresponding to an additional caption;

computing an additional phrase similarity score by comparing the additional face image to the phrase; and adding the additional face image with the phrase to the set of annotated face images based on the additional phrase similarity score.

19. The non-transitory computer readable medium of claim 18, wherein comparing the additional face image to the phrase comprises:

embedding the additional face image to obtain an additional image embedding, wherein the additional phrase similarity score is computed based on the additional image embedding and the phrase embedding.

\* \* \* \* \*